United States Patent [19]

Penifaure

[11] 4,399,587
[45] Aug. 23, 1983

[54] DEVICE FOR AUTOMATICALLY BRINGING THE PIVOTING WHEELS OF A MANUAL TRUCK BACK TO A PREDETERMINED DIRECTION

[75] Inventor: Jacques P. Penifaure, Creil, France

[73] Assignee: Saxby, Paris, France

[21] Appl. No.: 247,286

[22] Filed: Mar. 25, 1981

[30] Foreign Application Priority Data

Mar. 28, 1980 [FR] France ................. 80 07025

[51] Int. Cl.³ ............................................ B60B 33/00
[52] U.S. Cl. .................................................. 16/35 D
[58] Field of Search .................... 16/18 R, 35 D, 35 R

[56] References Cited

U.S. PATENT DOCUMENTS

| | | | |
|---|---|---|---|
| 1,896,234 | 2/1933 | Hathorn | 16/35 P X |
| 2,525,362 | 10/1950 | Levy | 16/35 D X |
| 2,626,116 | 1/1953 | Steuby | 16/35 D X |
| 3,924,292 | 12/1975 | Christensen | 16/35 D |
| 4,028,773 | 6/1977 | Morgan | 16/35 D X |
| 4,280,246 | 7/1981 | Christensen | 16/35 D |

Primary Examiner—Paul A. Bell
Attorney, Agent, or Firm—Irvin A. Lavine

[57] ABSTRACT

Device for automatically bringing the pivoting wheels of a manual truck back to a predetermined direction, each pivoting wheel (1) being mounted in a fork (2) pivoting about a vertical axis with respect to a fixed support (4) integral with the base (5) of the truck, comprising at least one mobile shoe (10) carried by the fork (2) and bearing resiliently on an appropriately shaped cam (12) integral with the fixed support (4) of said fork (2), under the action of a spring (11) working under compression.

4 Claims, 4 Drawing Figures

DEVICE FOR AUTOMATICALLY BRINGING THE PIVOTING WHEELS OF A MANUAL TRUCK BACK TO A PREDETERMINED DIRECTION

The present invention relates to a device for automatically bringing the pivoting wheels of a manual truck back to a predetermined direction, each pivoting wheel being mounted in a fork pivoting about a vertical axis with respect to a fixed support integral with the base of the truck.

Such a device is particularly advantageous when it is a question of trucks intended to be transported by means of remote-controlled automatic handling devices such as those described in French patent no. 75 16797 of 29th May, 1975, entitled: "Installation for the automatic handling of manual trucks, particularly hospital trucks".

In this installation in fact the manual trucks, in the case in point hospital trucks, rest on the ground on four wheels, only two of which are provided pivoting so as to facilitate manual manoeuvres. At the outset the trucks are introduced into lateral slides and the pivoting wheels then come naturally into position in alignment with the truck, i.e. parallel with its longitudinal axis. They are then taken over by automatic devices, designed to slide under the thus perfectly disengaged base of the truck so as to lift it for transporting it to a given place. Now, it is important, during this movement, that the pivoting wheels be usable to turn, for that could create difficulties when the unit passes through the landing doors of elevators or among the obstacles disposed along the path.

Furthermore, these trucks are arranged in order at the destination and may then in some cases be taken over by other automatic devices. It is then necessary for the pivoting wheels to be well aligned, as they were when they were initially engaged in the starting slides, so that this re-engagement takes place in the right conditions.

Up to now, to ensure the automatic return of the pivoting wheels and bring them back into alignment with the truck, a V-shaped spring blade was used, integral with a fixed part of the truck, and bearing normally at the end of the V's on a rod carried by the fork of the wheel. Thus, the rotation of the fork causes an upward elastic deformation of the spring blade and generates therefore a return force towards the stable position, because of the bearing force exerted by the spring on the rod.

This spring blade system presents however the drawback of deteriorating very rapidly because of the fatigue of the spring causing it to break. Moreover, the considerable pressure which it was required to exert on the rod through the spring led to rapid wear of this rod and so to mechanical jamming.

The present invention aims essentially at remedying these drawbacks and, for that, it provides a device of the above-mentioned type which is essentially characterized in that it comprises at least one mobile shoe carried by the fork and bearing resiliently on an appropriately shaped cam integral with the fixed support of said fork, under the action of a spring working under compression.

In a particular embodiment of the invention, the fork is provided with a cylindrical rod disposed parallel to the axis of rotation of the wheel and on which slide two shoes urged towards each other by two coil springs acting in opposite directions, whereas the cam is formed by two spaced fingers disposed between said shoes, in alignment with said predetermined direction.

Thus, the automatic return of the pivoting wheel is effected solely by means of coil springs working under compression, so without risk of breakage through fatigue. Furthermore, the return force is exerted perpendicularly to the bearing surfaces and the pressures of the parts in contact are then, for this reason, smaller than in the spring blade system used up to now.

One embodiment of the invention is described hereafter by way of example, with reference to the accompanying drawings in which.

Figure 1:
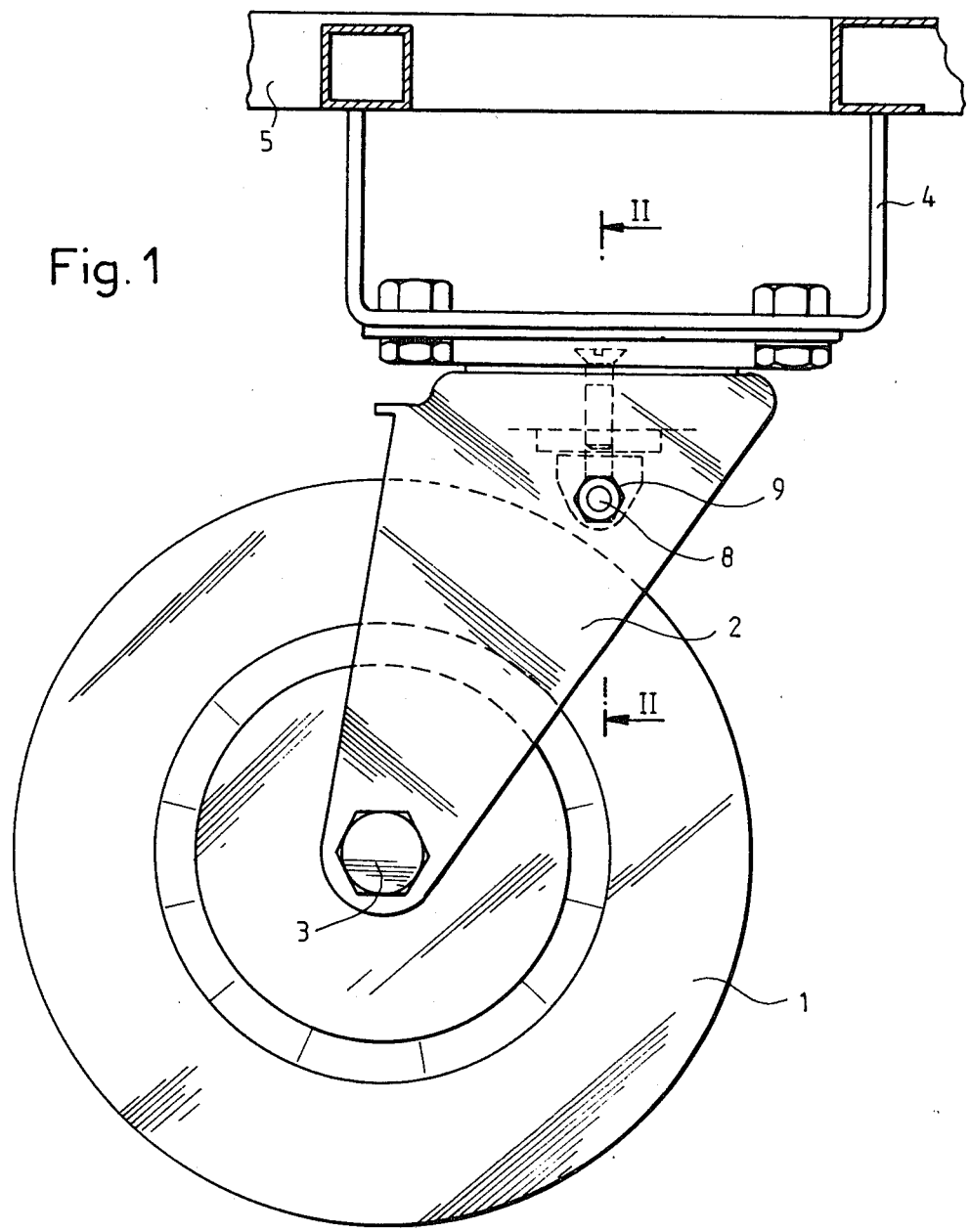
FIG. 1 is an elevational view of a manual truck pivoting wheel, equipped with an automatic return device in accordance with the invention.
Figure 2:
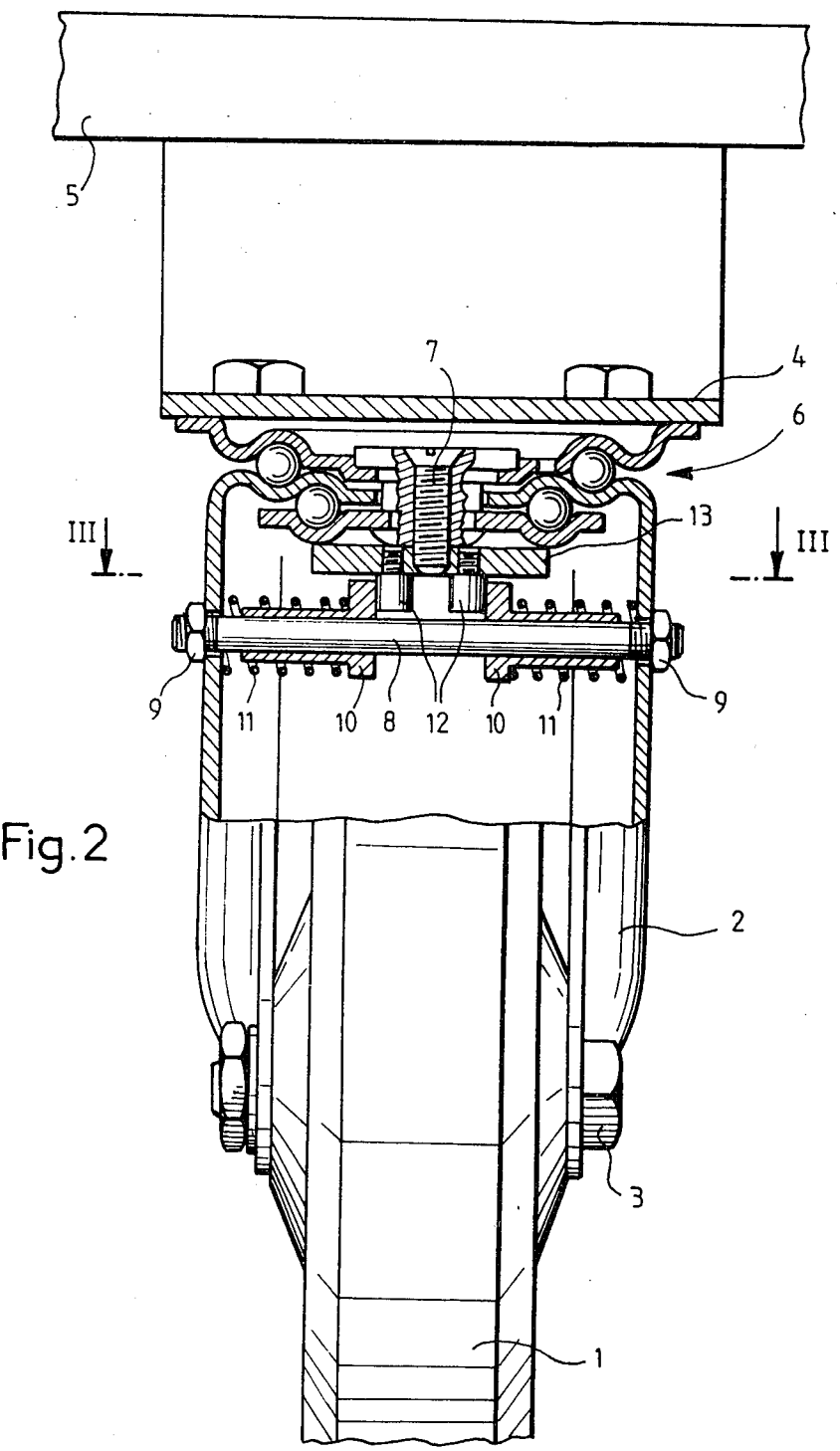
FIG. 2 is a sectional view along line II—II of FIG. 1.

Referring first of all to FIGS. 1 and 2, there can be seen a wheel 1 which is mounted in a fork 2 so as to be able to rotate freely about a horizontal axis formed here by a bolt 3. This fork is pivoted about a vertical axis and may thus pivot about said axis with respect to a fixed support 4 integral with the base 5 of a manual truck, e.g. a hospital truck of the kind described in the above-mentioned French patent. So as to avoid any excessive friction, fork 2 is, in a way known per se, mounted on the fixed support 4 by means of a double ball-race 6 held in place by means of screw 7 forming the vertical pivoting shaft for the fork.

In accordance with the invention, fork 2 is provided with a cylindrical rod 8 disposed parallel to the axis of rotation 3 of wheel 1 and which is fixed on the two flanges of the fork by two nuts 9 cooperating with the threaded ends of said rod. On this rod are slidable mounted two shoes 10 which are urged towards one another by two coil springs 11 working under compression. Thus, as can be very clearly seen in FIG. 2, each of these springs surrounds the rod and bears respectively on a shoulder of the shoe and on the internal face of the corresponding flange of fork 2.

Under the combined action of the two springs 11, shoes 10 bear firmly against two fingers 12 carried by a plate 13 which is rigidly locked to the fixed support 4 by means of screw 7. These two fingers are slightly spaced from each other and are disposed in alignment with the truck, i.e. parallel to its longitudinal axis, if we consider the common plane formed by said fingers.

Figure 4:
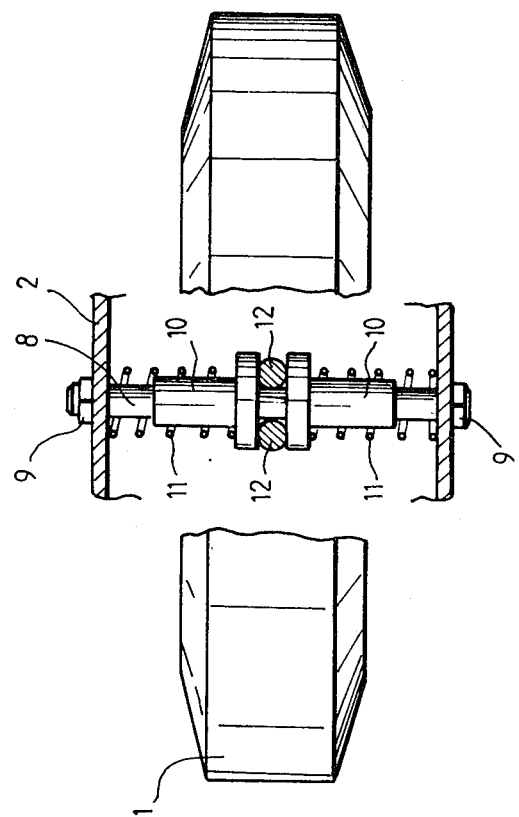
FIG. 4 is a view similar to FIG. 3, showing the pivoting wheel in its position of stable equilibrium.

Thus, when fork 2 rotates about its vertical pivot shaft, fingers 12 compress springs 11 through shoes 10, which creates a return torque tending to bring the fork, and so wheel 1, automatically back to a position of stable equilibrium corresponding to that shown in FIG. 4. In this positiobn, the two shoes 10 exert on fingers 12 opposite and equal forces leading to equilibrium, and wheel 1 is then orientated in the desired direction, i.e. it is in alignment with the truck.

Figure 3:
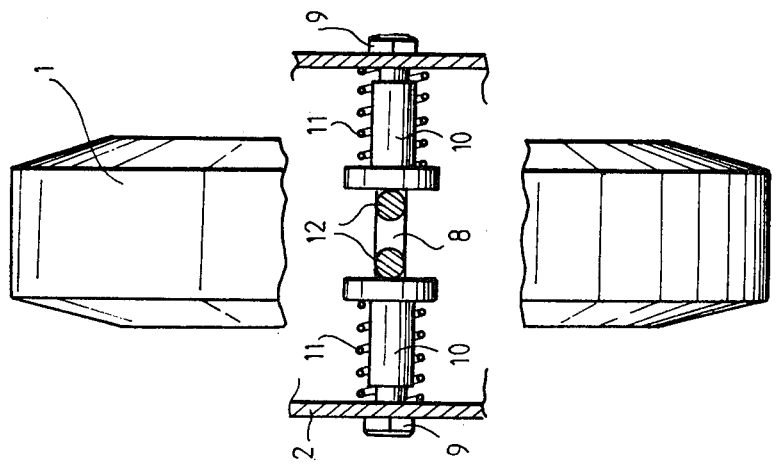
FIG. 3 is a sectional view along line III—III of FIG. 2, showing the pivoting wheel in its position of unstable equilibrium.

If the fork rotates 90° with respect to this position, there appears another position of equilibrium, shown in FIG. 3, but which is unstable. After passing through this unstable position of equilibrium, wheel 1 may then rotate again by 90° in one direction or in the other, which is in no wise inconvenient since wheel 1 is again in any case in alignment with the truck.

It is evident moreover that the present invention is not limited to manual trucks of the kind used in hospitals. It may in fact be advantageously applied, and in a general way, to any manual truck capable of being handled by means of remote-controlled automatic devices, as is the case at present for example in the motor industry and in other industries.

What is claimed is:

1. A device for automatically returning the pivoting wheels of a manual truck to bring them back to a predetermine direction, comprising:
    (a) a base,
    (b) a wheel,
    (c) a fork,
    (d) means for rotatably supporting said wheel in said fork,
    (e) means for mounting said fork on said base for pivotal movement about a vertical axis, and
    (f) means for biasing the fork to a predetermined alignment, comprising:
        (i) a cylindrical rod carried by said fork parallel to the axis of rotation of said wheel,
        (ii) a cam fixed with respect to said base and lying within said fork,
        (iii) shoes means slidable on said rod for engaging said cam, and
        (iv) compression spring means for resiliently urging said shoe means against said cam.

2. The device of claim 1, said shoe means comprising a pair of shoes and said spring means comprises a pair of springs acting to urge said shoes towards each other.

3. The device of claim 2, said cam comprising a pair of spaced, vertically extending fingers.

4. The device of claim 3, wherein a line between said fingers extends perpendicularly to the predetermined direction.

* * * * *